United States Patent [19]

Moon et al.

[11] 3,856,585
[45] Dec. 24, 1974

[54] METHOD AND APPARATUS FOR THERMALLY DECOMPOSING A HALOGENATED HYDROCARBON TO PROVIDE A GASEOUS CARRIER MEDIUM FOR VAPOR EPITAXIAL GROWTH

[75] Inventors: Ronald L. Moon, Palo Alto, Calif.; William W. Stein, Fort Wayne, Ind.; Donald Warnock, Aromas, Calif.

[73] Assignee: Varian Associates, Palo Alto, Calif.

[22] Filed: Aug. 4, 1972

[21] Appl. No.: 277,965

[52] U.S. Cl............. 148/175, 117/106 A, 117/201, 148/174, 252/62.3 GA, 423/481
[51] Int. Cl........................ H01l 7/36, C01b 7/08
[58] Field of Search ........ 148/174, 175; 117/106 A, 117/201; 252/62.3; 423/481, 483, 486, 453, 454, 458, 502

[56] References Cited
UNITED STATES PATENTS

| | | | |
|---|---|---|---|
| 2,403,735 | 7/1946 | Mason et al. | 423/486 |
| 3,310,425 | 3/1967 | Goldsmith | 117/106 |
| 3,462,323 | 8/1969 | Groves | 148/175 |

OTHER PUBLICATIONS

Effer; D., "Epitaxial Growth of Dopey and Pure Gaas in an Open Flow System," J. Electrochem. Soc., Vol. 112, No. 10, Oct. 1965, p. 1020–1025.
Shaw et al., "Gallium Arsenide Epitaxial Technology" 1966 Symposium on GaAs, Reading, Paper No. 2, p. 10–15.
Fergusson et al., "Transport of Gallium Arsenide by Chemical Reaction," J. Electrochem. Soc., Vol. 111, No. 5, May, 1964, p. 585–592.
Weinstein et al., "Preparation and Properties of GaAs-Hap, Heterojunctions," J. Electrochem. Soc., Vol. 111, No. 6, June 1964, p. 674–682.

*Primary Examiner*—L. Dewayne Rutledge
*Assistant Examiner*—W. G. Saba
*Attorney, Agent, or Firm*—Stanley Z. Cole

[57] ABSTRACT

A halogenated hydrocarbon such as chloroform is used as a source for a hydrogen halide, such as hydrogen chloride, which in turn is used as a transporting agent for vapor deposition. The hydrogen halide is obtained by thermal decomposition of the halogenated hydrocarbon. This is accomplished by saturating a carrier gas withe the halogenated hydrocarbon and then introducing the mixture into a cracking region of elevated temperature. Subsequent to introducing the newly formed transporting agent and its carrier gas into the growth apparatus, the mixture is passed through a cold trap which condenses all substances less volatile than the hydrogen halide. In the case of chloroform, for example, the HCl produced from thermal decomposition is passed over a III–V source material, such as GaAs, held at an elevated temperature to form a gaseous column III halide plus a column V vapor specie. These vapor species are carried to a lower temperature region where surface catalyzed deposition takes place on a substrate.

9 Claims, 1 Drawing Figure

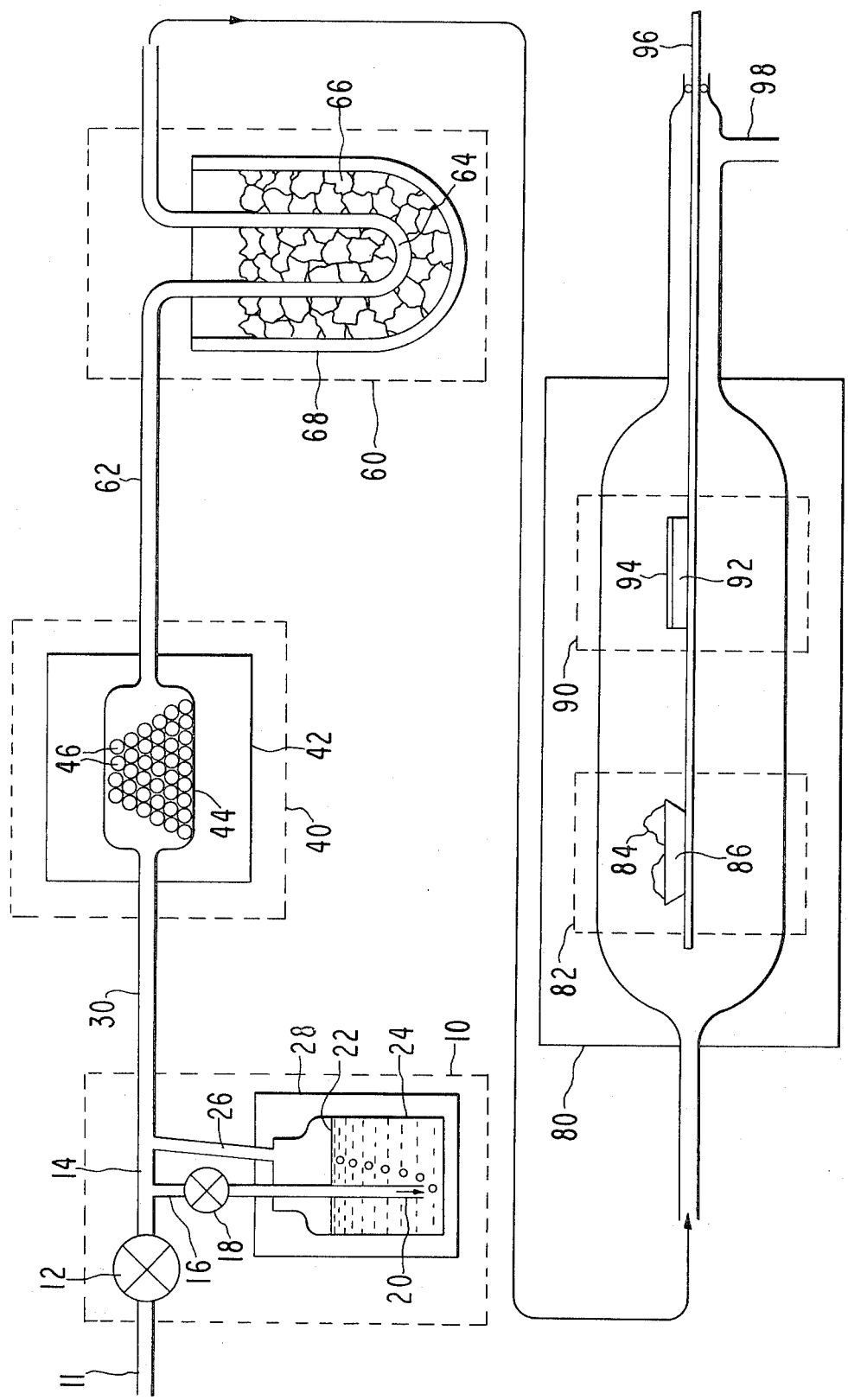

METHOD AND APPARATUS FOR THERMALLY DECOMPOSING A HALOGENATED HYDROCARBON TO PROVIDE A GASEOUS CARRIER MEDIUM FOR VAPOR EPITAXIAL GROWTH

BACKGROUND OF INVENTION

1. Field of Invention

This invention relates to a transporting gas for vapor phase epitaxial growth, and more particularly to a transporting gas formed by thermal decomposition of a halogenated hydrocarbon.

2. DESCRIPTION OF PRIOR ART

Vapor epitaxial growth of III-V compounds is currently carried out by either the hydrogen-halide-hydride or the column V trichloride process. In the HCl-arsine method, taking growth of GaAs as an example, HCl is introduced directly into the reactor and reacts with a Ga melt to form gallium chlorides. Arsenic vapor is generated from the thermal decomposition of arsine ($AsH_3$) which is introduced into the reactor in a separate feed line. These two streams are eventually mixed and flow downstream to react with the substrate.

For the arsenic trichloride process the situation is somewhat changed because both the arsenic and hydrogen chloride are obtained from the same source. Introduction of hydrogen-saturated $AsCl_3$ into a hot reactor causes decomposition into HCl and arsenic vapor. This mixture then passes over a gallium melt previously saturated with arsenic and reacts to form gallium chlorides plus more arsenic vapor. Reaction at the substrate downstream is the same.

One important variation of these schemes is to generate HCl-arsine process by thermally decomposing $AsCl_3$. The arsenic vapor and hydrogen chloride decomposition products are then passed through a cold trap to condense the arsenic before passing into the reactor. This provides a purer hydrogen chloride than other sources and also allows one to utilize the versatility of the hydride process.

SUMMARY OF THE INVENTION

It is therefore an object of this invention to: provide a source for a gaseous transporting agent which is not toxic in small quantities; provide a source for transporting a gaseous agent which is not corrosive to the storage tanks and distribution apparatus; provide a very pure gaseous transporting agent; provide a source for a transporting agent whose basic ingredient is an ultra pure, easily handled, and inexpensive substance; provide a gaseous transporting agent which is produced by thermally decomposing a halogenated hydrocarbon.

BREIF DESCRIPTION OF THE DRAWING

Further objects and advantages of the present halogenated hydrocarbon derivative transporting gas and the formation and application thereof will become apparent from the following detailed description taken in connection with the drawings in which:

FIG. 1 is a schematic view of the carrier gas vaporizing, cracking, and purifying apparatus and its application in a vapor phase epitaxial growth furnace.

DESCRIPTION OF THE PREFERRED EMBODIMENT 3

FIG. 1 shows a vaporization stage 10, a cracking stage 40, and an auxiliary pruification stage 60 for generating the gas from a halogenated hydrocarbon, and a furnace 80 for vapor phase epitaxial growth. Vaporizing stage 10 is supplied with a hydrogen gas flow through input tube 11. After passing through a main flow control valve 12 the hydrogen flow is divided into a main flow tube 14 and into a vaporization flow tube 16. The vaporization flow then passes through a vaporization flow control valve 18 and into a bubbler tube 20 which extends into a liquid halogenated hydrocarbon 22 contained in a vaporization chamber 24. Many halogenated hydrocarbons produce derivitives which are operable as transporting agents; but as is discussed hereinafter, chloroform is preferred and will be cited in the description of FIG. 1 with the understanding that other halogenated hydrocarbons are also suitable. The hydrogen bubbles in passing through liquid chloroform 22 become saturated with chloroform and return to main flow tube 14 via a vaporization return tube 26. The amount of chloroform passed into the cracking stage is determined by the flow rate and the vapor pressure of chloroform liquid 22. The vaporization chamber 24 and chloroform liquid 22 are preferably maintained at a temperature of about $-60°C$ to $0°C$ by a temperature control device 28 for establishing a chloroform vapor pressure of about 1mm to 70mm Hg which appears suitable for most applications. Lower temperatures prevent vaporization of less volatile impurities if any are present in liquid 22. Preferably, temperature control device 28 is adjustable to maintain a range of temperatures and vapor pressures for controlling the amount of chloroform incorporated into the hydrogen flow without disturbing the flow volume through the furnace. In applications where a flow volume change is permissible, valves 12 and 18 may be operated in combination to obtain the desired gas flow rate and chloroform incorporation. A low flow rate causes a lower epitaxial growth rate which produces crystals of a higher quality. Inert gases may be employed in the gas flow alone or mixed with hydrogen. Hydrogen however is preferred because it supplies at least a portion of the hydrogen in the hydrogen chloride.

The chloroform-hydrogen output flow from vaporization stage 10 is transported to chloroform cracking stage 40 through tube 30. Cracking stage 40 contains a furnace 42 which raises the temperature of the chloroform hydrogen flow to at least 300°C to cause thermal decomposition of the chloroform and preferably to 800°C or greater to decompose any hydrocarbon by-product such as methane generated during the cracking of the chloroform. The exact temperature for thermal decomposition depends on reaction geometry, flow rate, carrier gas, thermodynamic stability and must be determined for each specific case. A glass bead pack 44 containing glass beads 46 provides the catalytic surface required for thermally decomposing the chloroform. Other surfaces and materials may be employed. During the surface enhanced cracking reaction, the chloroform is reduced to carbon and hydrogen chloride gas by the following equation:

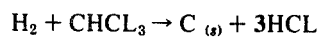

$$H_2 + CHCL_3 \rightarrow C_{(s)} + 3HCL$$

The HCl thus generated remains in a gaseous form in the hydrogen flow, while the carbon thus formed deposits on the catalytic surface of glass beads 46. It is preferred that the carbon be removed from the gas flow at this stage to prevent the carbon from depositing on the interior surfaces of the furnace or being incorporated into the epitaxial growth. Carbon contamination appears to be one of the least damaging impurities. Concentrations of carbon greater than $10^{-18}C_m^{-3}$ have been shown to have little effect on the electrical properties of high purity gallium arsenide (C. M. Wolfe, G. E. Stillman, E. E. Owens, Journal of The Electrochemical Society, 117, 129, 1970). However, the exact impact of the carbons on all applications is undetermined and it is preferrable to remove them prior to the epitaxial growth.

The hydrogen halide flows from cracking stage 42 to auxiliary purification stage 60 through flow tube 62. Flow tube 62 is provided with a U-shaped portion 64 which extends downward into a dry ice pack 66 contained within a cold trap container 68. Dry ice has a temperature of $-73°C$ which is only $10°$ higher than the boiling point of hydrogen chloride $-83°C$. The cold trap condenses all impurities contained in the halogenated hydrogen flow which are less volatile than hydrogen chloride. The cold trap stage 60 removes chloroform and partially decomposed by-products thereof, and hopefully all electrically active contaminants.

Cold trap flow tube 62 conducts the purified hydrogen halide from purification stage 60 into furnace stage 80 where the vapor phase epitaxial growth is accomplished using standard vapor phase epitaxial techniques. Furnace 80 contains a high temperature region 82 wherein the III–V source material 84 contained in a source crucible 86 is vaporized. The vaporization occurs in accordance with the following chemical equation using gallium arsenide as a specific example. Clearly, other III–V compounds or II–Vi compounds may be so vaporized using our halogenated hydrocarbon carrier gas.

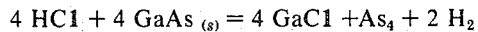

For the gallium arsenide example, the higher temperature region should be from $800°$ to $900°C$. Different temperatures will be required by other III–V and II–VI compounds.

Furnace 80 also contains a lower temperature region 90 where the vaporized source materials are condensed onto a substrate 92 forming epitaxially grown layer 94 in accordance with the following chemical equations.

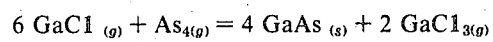

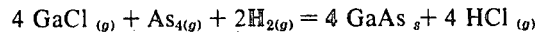

For the gallium arsenide example, the lower temperature region should be maintained at a temperature of from about $700°$ to about $800°C$ depending on the quality of crystal desired, the quality and thickness of crystal desired, and the available growing time. Substrate 92 and epitaxially grown layer 94 are removed from furnace 80 by means of a removable support rod 96 upon which the substrate 92 is mounted. Source crucible 86 may be mounted and removed on the same rod as is shown in FIG. 1. The resultant hydrogen chloride and hydrogen gas flow is passed through a bubbler tube 98.

While chlorine has been shown in the description of FIG. 1, other halides such as iodine, bromine and fluorine are suitable for use as the halide in the carrier gas. Other halides also transport metals as well as chlorides and suitable examples are discussed in H. Schafer's book *Chemical Transport Reaction*, Academic Press (1964) New York. The temperature of liquid halogenated hydrocarbon 22 should be adjusted to accommodate the vapor pressure characteristic of the particular halide employed. Further, the temperature of cracking furnace 42 should be adjusted to accommodate the cracking or thermal decomposition temperature of the halogenated halide employed. The exact temperature of decomposition is a function of several factors and must be determined in each case. The correct temperature would be adjusted to maximize the conversion to halogenated halide to minimize any undesirable side reactions.

The phase halogenated halide is meant to include carbon-hydrogen-halide chemicals wherein the halide and hydrogen may be exchanged. To illustrate this construction, the term chlorinated hydrocarbon includes $H_3CCl$ (Methyl chloride), $H_2CCl_2$ (Dichloromethane-Methylene chloride), $HCCl_3$ (Chloroform), $CCl_4$ (Carbon tetrachloride); and $H_2C_2Cl_2$ (Ethylidene dichloride), etc.

The present halogenated hydrocarbon carrier gas is particularly useful in epitaxially growing III–V and II–VI compounds, some of which are listed in the following table which gives the preferred higher temperature and preferred lower temperature (deposition temperature) of furnace 80.

|      | Higher Temp. | Lower Temp. |
|------|--------------|-------------|
| GaAs | 900 – 800°   | 800 – 730°C |
| GaP  | 950 – 850°C  | 830 – 780°C |
| InAs | 800 – 750°C  | 730 – 670°C |
| InP  | 810 – 760°C  | 730 – 670°C |
| ZnS  | 1100 – 1000  | 950 – 730°  |

What is claimed is:

1. A method of forming a hydrogen halide gas during vapor phase epitaxial growth of a compound crystal having at least one higher valence constituent and at least one lower valence constituent on the growing surface of a substrate, by incorporating a source material of the constituents in a carrier gas flow containing the hydrogen halide, the method comprising the steps:

storing an inert, non-toxic halogenated hydrocarbon;
    providing a gas flow containing the halogenated hydrocarbon;
    completely decomposing the halogenated hydrocarbon into carbon and a hydrogen halide;
    removing the carbon from the gas flow;
    exposing the source material to the gas flow containing the hydrogen halide at a first temperature sufficient to cause a chemical reaction between the hydrogen halide and the source material which produces a gaseous halide of the at least one lower valence constituent and a gaseous species of the at least one higher valence constituent; and
    exposing the substrate to the gas flow containing the source material in gaseous form at a second temperature lower than the first temperature causing the halide of the at least one lower valence constituent and the gaseous species of the at least one higher valence constituent to decompose permitting the constituents to expitaxially deposit on the growing surface of the substrate.

2. The method of vapor phase epitaxial growth of claim 1 wherein the halogenated hydrocarbon is thermally decomposed into carbon and a hydrogen halide.

3. The method of vapor phase epitaxial growth of claim 2 wherein the halogenated hydrocarbon is thermally decomposed on a catalytic surface upon which the carbon is deposited in solid form to removing the carbon from the gas flow.

4. The method of vapor phase epitaxial growth of claim 3 wherein the catalytic surface is a glass bead pack.

5. The method of vapor phase epitaxial growth of claim 1 wherein liquid halogenated hydrocarbon is vaporized into a hydrogen gas flow.

6. The method of vapor phase epitaxial growth of claim 5 wherein the liquid halogenated hydrocarbon is vaporized by bubbling the hydrogen gas flow therethrough.

7. The method of vapor phase epitaxial growth of claim 6 wherein the hydrogen gas flow is divided into a main flow and into a vaporization flow which is bubbled through the liquid halogenated hydrocarbon and returned to the main flow, the volume of the gas flow and the amount of halogenated hydrocarbon incorporated therein are controlled by valves in the main flow and in the vaporization flow respectively.

8. The method of vapor phase epitaxial growth of claim 6 wherein the amount of halogenated hydrocarbon incorporated into the gas flow is controlled by controlling the temperature of the liquid halogenated hydrocarbon.

9. The method of vapor phase epitaxial growth of claim 1 wherein subsequent to decomposing the halogenated hydrocarbon, the gas flow containing the hydrogen halide is passed through a cold trap to remove substances from the gas flow which are less volatile than the hydrogen halide.

* * * * *